United States Patent
Grinschgl et al.

(10) Patent No.: US 6,177,124 B1
(45) Date of Patent: Jan. 23, 2001

(54) ACTIVE-SUBSTANCE CONCENTRATE

(75) Inventors: Brigitte Grinschgl, Rodgau; Rolf Oelmüller, Hanau, both of (DE)

(73) Assignee: Degussa- Hüls Aktiengesellschaft, Frankfurt am main (DE)

( * ) Notice: Under 35 U.S.C. 154(b), the term of this patent shall be extended for 0 days.

(21) Appl. No.: 09/324,757

(22) Filed: Jun. 3, 1999

(30) Foreign Application Priority Data

Jun. 9, 1998 (DE) .............................. 198 25 687

(51) Int. Cl.$^7$ ..................................... A23K 1/175
(52) U.S. Cl. .................. 426/656; 426/471; 426/654; 426/805; 426/807
(58) Field of Search .................... 426/656, 807, 426/805, 654, 471

(56) References Cited

U.S. PATENT DOCUMENTS

| | | | |
|---|---|---|---|
| 4,775,540 | * 10/1988 | Hertel et al. | 426/74 |
| 4,859,709 | * 8/1989 | Rawlins | 514/770 |
| 4,950,488 | * 8/1990 | Schweitzer et al. | 426/1 |
| 5,248,702 | * 9/1993 | Neumann et al. | 521/84.1 |
| 5,300,250 | * 4/1994 | Morgan et al. | 252/135 |
| 5,468,720 | * 11/1995 | Lisa et al. | 504/236 |
| 5,486,363 | * 1/1996 | Kiefer et al. | 424/442 |
| 5,766,668 | * 6/1998 | Brommedsiek et al. | 426/648 |

FOREIGN PATENT DOCUMENTS

| | | |
|---|---|---|
| 1812351 | * 8/1970 | (DE) . |
| 2209477 | 9/1973 | (DE) . |
| 4218768 | 12/1993 | (DE) . |
| 0142093 | 5/1985 | (EP) . |
| 0253212 | 1/1988 | (EP) . |
| 9629886 | 10/1996 | (WO) . |
| 9632949 | 10/1996 | (WO) . |
| 9907237 | 2/1999 | (WO) . |

* cited by examiner

Primary Examiner—Chhaya D. Sayala
(74) Attorney, Agent, or Firm—Smith Gambrell & Russell, LLP; Beveridge, DeGrandi, Weilacher & Young

(57) ABSTRACT

Active-substance concentrate that is a free-flowing powder with a content of active substance amounting to 85 to 98 wt.-%, 3 to 7 wt.-% hydrophobic silicon-dioxide variant and maximally 0.5 wt.-% water is prepared by a suspension being produced from the aqueous active-substance solution and the hydrophobic silicon-dioxide variant and by this suspension subsequently being spray-dried. The active-substance concentrate may be employed as a feed supplement in premixes and mixed feeds.

11 Claims, No Drawings

ACTIVE-SUBSTANCE CONCENTRATE

The present invention relates to an active-substance concentrate, the process for its preparation and its use.

It is known to prepare mixtures consisting of choline chloride and precipitated silica by mixing an aqueous solution of choline chloride together with at least 2% hydrophilic silica and at least about 3% water-repellent silica, whereby, however, the mixing process is concluded so long as silica still rises to the surface of the mixture after an interruption of the mixing movement, and by subsequently spray-drying this mixture (DE-A 22 09 477).

The known mixture consisting of precipitated silica and aqueous choline chloride solution has the disadvantage that a sufficient stability in storage is not ensured without impairing the flowability.

It is furthermore known to prepare powders containing choline chloride by atomizing an aqueous choline chloride solution in a spray tower, in which connection a cloud of finely divided hydrophobic precipitated silica (SIPERNAT D17 produced by Degussa AG) is present in the spray tower. In the process the hydrophobic precipitated silica is deposited on the surface of the choline chloride particles. The product obtained is dried in a fluidized-bed drier. It has an active-substance content amounting to 95.8 wt.-% (DE-A 42 18 768).

The known powder that contains choline chloride has the disadvantage that it is stable in storage only for a few days. Water is secreted from the product after as little as 24 hours.

It is therefore an object of the invention to prepare a mixture consisting of silicon-dioxide variants and active-substance solution, in particular aqueous choline chloride solution, that is stable in storage over a relatively long period and remains flowable.

SUMMARY OF THE INVENTION

The above and other objects of the present invention can be achieved in the form of an active substance concentrate that has the following characteristics:

a) active substance content: 85 to 98 wt.-%, preferably 93 to 97 wt.-% b) hydrophobic silica/silicate 2 to 15 wt.-%, c) water (upon discharge maximally 0.5 wt.-% from the drier):

d) stability in storage: at least 1.5 years with an equilibrium water content e) free-flowing powder.

By way of silicon dioxide variant, precipitated silicas, pyrogenically prepared silicas and/or silicates may be employed. All of these products are known in the art.

These substances are known from Ullmann's Enzyklopadie der technischen Chemie, Volume 21, 4th Edition, pages 462 to 476 (1982).

In a preferred embodiment of the invention the active-substance concentrate may contain choline chloride by way of active substance.

Further active substances may be hygroscopic substances from the food sector, such as hydrolyzed vegetable protein for example, hygroscopic substances from the animal-feedstuff sector, such as iron sulfate for example.

A further aspect of the present invention resides in a process for preparation of the active-substance concentrate, comprising forming a master-batch suspension with a content of 10 to 15 wt.-% of hydrophobic silicon-dioxide variant, in particular with the hydrophobic precipitated silica Sipernat D10, and 85 to 90 wt.-% of a 40 to 80-% aqueous active-substance solution, in particular 70 to 80-% aqueous choline chloride solution. The master batch is firstly produced by mixing the constituents in the form of a reversal emulsion, for example with the aid of a dissolver disc which keeps the suspension in motion, and/or intensive mixing with the aid of a bead mill with cooling device (Dyno mill). This master-batch suspension formed thereby is optionally diluted with water or with further aqueous active-substance solution and is subsequently spray dried by means of any suitable equipment therefor.

A mixing device that subjects the material to be blended to a forced supply and generates a high shear effect can be employed with particular advantage.

DETAILED DESCRIPTION OF INVENTION

Further details of the present invention are presented below. In carrying out the invention a variety of silicas can be used.

By way of example, hydrophobic precipitated silicas, precipitated silicas that are made water-repellent by known processes may be employed.

The water-repellent precipitated silica, known by the trademark SIPERNAT D10, may preferably be employed. This precipitated silica is characterised by the following physicochemical characteristic data:

|  |  | SIPERNAT D10 (hydrophobic) |
|---|---|---|
| appearance |  | loose white powder |
| surface area according to BET[1] | m$^2$/g | 90 |
| mean particle size | μm | 5 |
| compacted bulk density[2] | g/l | 100 |
| drying loss[3] (2 h at 105° C.) | % | 3 |
| ignition loss[4)8] (2 h at 1,000° C.) | % | 7[9] |
| pH value[5] (in 5-% dispersion) |  | 10.3[10] |
| SiO$_2$[7] | % | 98 |
| Na$_2$O[7] | % | 1.0 |
| SO$_3$ | % | 0.8 |
| C[7] | % | 3.0 |
| methanol wettability | % | about 60 |
| oversize material[6] (acc. to Mocker, 45 μm) | % | 0.01 |

[1] acc. to ISO 5794/1
[2] acc. to DIN ISO 787/11, JIS K 5101/21 not sieved
[3] acc. to DIN ISO 787/2, ASTM D 280, JIS K 5101/21
[4] acc. to ISO 3262/11, ASTM D 1208, JIS K 5101/23
[5] acc. to DIN ISO 787/9, ASTM D 1208, JIS K 5101/24
[6] acc. to DIN ISO 787/18, JIS K 5101/20
[7] relative to the substance ignited for 2 hours at 1,000° C.
[8] relative to the substance dried for 2 hours at 105° C.
[9] includes about 3% chemically bonded carbon
[10] in water: methanol 1:1

Instead of the hydrophobic precipitated silica, hydrophobic, pyrogenically prepared silicas or hydrophobic silicates may also be employed.

Mixing of the constituents with a view to producing the master-batch suspension is effected with shear forces that permit a phase reversal—that is to say, a rewetting of the surface of the precipitated silica—to be achieved. This phase reversal signifies a complete wetting of the hydrophobic precipitated silica with the aqueous active-substance solution without addition of wetting agents.

Premixing may preferably be carried out by means of a dissolver disc; the definitive preparation of a premix may be carried out, in particular, by means of a bead mill. Drying is preferably effected by spray drying.

The active-substance concentrate according to the invention presents the following advantages:

In the course of storage no change occurs in the physical properties such as stability in storage, grain size or flowability, despite a maximum increase in weight amounting to 33% moisture from the air. The maximum absorption of water in this case is dependent on the atmospheric humidity. In this connection it is a question of an equilibrium content.

The active-substance concentrate according to the invention may be used for the preparation of premixes and mixed feeds, in which connection it serves as a feed supplement for livestock.

EXAMPLE 1

Preparation of a 95-% Choline Chloride Powder That is Stable in Storage a) Production of a Master Batch Suspension A weighed portion of 85 parts by weight of a 75-% choline chloride solution and 15 parts by weight Sipernat D10 silica is mixed in a high-shearing mixing unit with cooling device (analytical mill with water cooling, diameter 6 cm; knife 5.5 cm; 20,000 rpm) until such time as a pasty homogeneous suspension has formed. The end of the mixing process is reached when a phase reversal has occurred and no more Sipernat D10 brand silica is floating.

It is possible for the suspension obtained in this way to be diluted to any desired concentration both with 75-% choline chloride solution and with water.

b) Preparation of the 95-% choline chloride powder

To a weighed portion of 100 parts by weight of the master batch (85/15) 295 parts by weight of a 75-% choline chloride solution are added and are blended with the aid of a low shearing mixing unit (lab: for example, blade agitator, magnetic stirrer). The dilution that has been formed in this way contains a Sipernat-D10 brand silica concentration amounting to 3.8%. If it is not possible for the suspension to be pumped or atomized by reason of the viscosity, further dilution can be effected with water.

The suspension obtained in this way is atomized in the spray drier with dried air or under $N_2$ atmosphere.

The end product is a dry 95-% choline chloride powder that is stable in storage.

EXAMPLE 2

Preparation of a 95-% Choline Chloride Powder That is Stable in Storage a) Production of a Master-batch Suspension A weighed portion of 90 parts by weight of a 75-% choline chloride solution is processed in a bead mill with cooling device ("Dyno Mill" type, continuous operating mode at 2,000 rpm, exit slit 0.3 mm, mixing vessel 300 ml, glass beads 1 mm diameter, blade disc 8 cm diameter) accompanied by dosing of 10 parts by weight Sipernat D10 brand silica so as to form a pasty homogeneous suspension. Working may also proceed in a batch process, by the Sipernat D10 brand silica, a) being dosed into the exchange vessel, whereby the suspension is constantly premixed with the aid of a dissolver disc, b) being dosed through a second opening directly into the continuous suspension.

The end of the mixing process is reached when a phase reversal has occurred and no more Sipernat D10 is floating.

It is possible for the suspension obtained in this way to be diluted to any desired concentration both with 75-% choline chloride solution and with water with the aid of a simple mixing unit (for example, a propeller mixer).

b) Preparation of the 95-% Choline Chloride Powder

To a weighed portion of 100 parts by weight of the master batch (90/10) 163 parts by weight of a 75-% choline chloride solution are dosed and are blended with the aid of a low shearing mixing unit (for example, a propeller mixer). The dilution that has been formed in this way contains a Sipernat-D10 concentration amounting to 3.8%. If it is not possible for the suspension to be pumped or atomised by reason of the viscosity, further dilution can be effected with water.

The suspension obtained in this way is atomized in the spray drier with dried air or under $N_2$ atmosphere.

The end product is a dry 95-% choline chloride powder that is stable in storage.

Open storage at room temperature and 50 to 80-% relative humidity is undertaken with this choline chloride powder. The results of this storage are listed in Table 1.

TABLE 1

| Open storage at RT and 50–80% rel. humidity | | |
|---|---|---|
| Storage time | Flow mark | Poured-cone height |
| 1 day | 1 | 12 mm |
| 2 days | 1 | 12 mm |
| 3 days | 1 | 11 mm |
| 1 week | 1 | 11 mm |
| 2 weeks | 1 | 11 mm |
| 3 weeks | 1 | 11 mm |
| 4 weeks | 1 | 10 mm |
| 1.5 years | 1 | 11 mm |

The flow mark and the poured-cone height are determined by the following methods:

Flowability by Means of Glass Funnel

For uniform emptying of a powder silo and exact dosing of the powder a good flow behaviour (of the respective powder) is a prerequisite. Powders that are not readily pourable do not flow or only flow through outflow vessels having a very large outflow opening; hence powders that are readily pourable are given a low mark.

Test instruments:

funnel No. 1=2.5 mm diameter funnel No. 2=5.0 mm diameter funnel No. 3=8.0 mm diameter funnel No. 4=12.0 mm diameter funnel No. 5=18.0 mm diameter Manufactured by: Henz, Schulstr. 18, 63549 Ronneburg, Germany.

Implementation

Beginning with funnel No. 5, the funnel is placed onto a sheet of weighing paper and is filled as far as the upper edge with the powder to be tested by means of a second weighing paper which serves as a funnel. By careful lifting the opening is cleared so that the powder can flow out. If the powder flows out through one funnel, the next smaller funnel is used and the aforementioned procedure is repeated.

| Evaluation | |
|---|---|
| Mark | Assessment |
| 1 | powder flows freely out of funnel No. 1 |
| 2 | powder flows freely out of funnel No. 2 |
| 3 | powder flows freely out of funnel No. 3 |
| 4 | powder flows freely out of funnel No. 4 |

-continued

| Mark | Evaluation Assessment |
|---|---|
| 5 | powder flows freely out of funnel No. 5 |
| 6 | powder does not flow freely out of vessel No. 5 |

Flowability by Means of Poured Cone Height

For uniform emptying of a powder silo and exact dosing of the powder a good flow behaviour of the respective powder is a prerequisite. A good assessment criterion for the flow behaviour is the angle of repose. Since, for the same base measurement, the poured cone height is directly related to the angle of repose and is significantly easier to determine, the poured cone height is determined. Readily pourable powders have a low poured cone height.

Test instruments
- metal sieve (1 mm)
- vernier height gauge
- solid metal cylinder, d=50 mm, h=80 mm
- scraper Implementation The wire sieve is fastened to the support at a distance of about 10 cm above the solid metal cylinder. With a view to setting the definitive height of the sieve, the powder that is expected to be poorest is poured slowly onto the sieve and is carefully passed through the sieve by means of a scraper. The distance of the sieve from the vertex of the poured cone of the powder is set to 2 cm. This height is maintained in all further comparison tests. If the poured cone of the powder is evenly formed, sieving of the powder is concluded and the poured cone height is read off at the vertex of the cone with the vernier height gauge.

Evaluation:

The poured cone height is given in mm.

Further variations and modifications of the foregoing will be apparent to those skilled in the art and are intended to be encompassed by the claims appended hereto.

German priority application 198 25 687.6 is relied on and incorporated herein by reference.

We claim:

1. A concentrate of a hygroscopic active substance in the form of a free-flowing powder, the concentrate consisting essentially of:
   from 85 to 98 wt. % of the hygroscopic active substance;
   from 3 to 7 wt. % hydrophobic silicon dioxide; and
   water, present in an equilibrium content based on atmospheric humidity,
   wherein the concentrate exhibits a stability in storage for at least 1.5 years maintaining an equilibrium content of water.

2. The concentrate according to claim 1, wherein the hygroscopic active substance comprises choline chloride.

3. The concentrate according to claim 1, wherein the hydrophobic silicon dioxide comprises at least one member selected from the group consisting of hydrophobic precipitated silica, hydrophobic pyrogenic silica, and at least one hydrophobic silicate.

4. The concentrate according to claim 1, wherein the hygroscopic active substance is a hydrolysed vegetable protein.

5. The concentrate according to claim 1, wherein the hygroscopic active substance is iron sulfate.

6. A process for the preparation of a free flowing concentrate of a hygroscopic active substance having 85–97% by weight active substance, the process comprising:
   forming a suspension consisting essentially of a mixture of 10 to 15 wt. % hydrophobic silicon dioxide, and 85 to 90 wt. % of a 70 to 80% aqueous solution of the active substance;
   mixing the suspension to a complete wetting wherein a phase reversal is exhibited;
   optionally mixing the resulting master-batch suspension with water or with a further portion of the aqueous solution of the active substance; and
   spray-drying to obtain a free flowing powder concentrate of the active substance having 85–97% by weight active substance.

7. The process according to claim 6, wherein the hygroscopic active substance comprises choline chloride.

8. The process according to claim 6, wherein the hydrophobic silicon dioxide comprises at least one member selected from the group consisting of hydrophobic precipitated silica, hydrophobic pyrogenic silica, and at least one hydrophobic silicate.

9. The process according to claim 6, wherein the hygroscopic active substance is a hydrolysed vegetable protein.

10. The process according to claim 6, wherein the hygroscopic active substance is iron sulfate.

11. An animal feed containing the concentrate of the hygroscopic active substance according to claim 1.

* * * * *